United States Patent [19]

Hall

[11] 4,356,637
[45] Nov. 2, 1982

[54] DEVICE FOR HOLDING A SURVEYOR'S RANGE POLE

[76] Inventor: George W. Hall, 3200 Viking Dr., Sioux City, Iowa 51104

[21] Appl. No.: 238,150

[22] Filed: Mar. 2, 1981

Related U.S. Application Data

[63] Continuation-in-part of Ser. No. 97,193, Nov. 26, 1979, which is a continuation-in-part of Ser. No. 953,704, Oct. 23, 1978, Pat. No. 4,192,076.

[51] Int. Cl.$^3$ .............................................. G01C 15/08
[52] U.S. Cl. ..................................................... 33/296
[58] Field of Search ................ 33/290, 292, 293, 294, 33/295, 296; 248/163, 165, 168, 187

[56] References Cited

U.S. PATENT DOCUMENTS

| 494,876 | 4/1893 | Merrill | 33/290 |
|---|---|---|---|
| 1,036,096 | 8/1912 | Graves | 33/292 |
| 2,245,901 | 6/1941 | Chaskin | 33/295 |
| 2,835,975 | 5/1958 | Zimmerman | 33/296 |
| 3,077,035 | 2/1963 | Hackney | 33/293 |
| 3,195,234 | 7/1965 | Glidden | 33/293 |
| 3,314,068 | 4/1967 | Verive | 33/293 |

*Primary Examiner*—John W. Shepperd
*Attorney, Agent, or Firm*—Zarley, McKee, Thomte, Voorhees & Sease

[57] ABSTRACT

A device for holding a surveyor's range pole in a vertical position. The pole is held rigid relative to a tripod base by a single bracket. The bracket is seated on the apex of the tripod and includes a collar member attached to an underlying three channel frame. Three horizontally disposed screws thread through the three channeled frame to mutually engage a range pole at the center of the collar.

Additionally, an extension arm may be secured to the top of the collar by means of an overlying pressure plate. The extension arm lies between two upright screws which pass through the pressure plate, and pressure is exerted on the extension arm by tightening wing nuts over the screws. The range pole is secured beyond the rim of the collar by passing it through a teardrop shaped aperture in the extension arm and pressing the pole against the edges of the teardrop shaped aperture by an adjustable screw threaded through the extension arm. A ring member similar to the collar member can be used in place of the teardrop shaped aperture as an alternate means of securing the range pole to the end of the extension arm.

5 Claims, 7 Drawing Figures

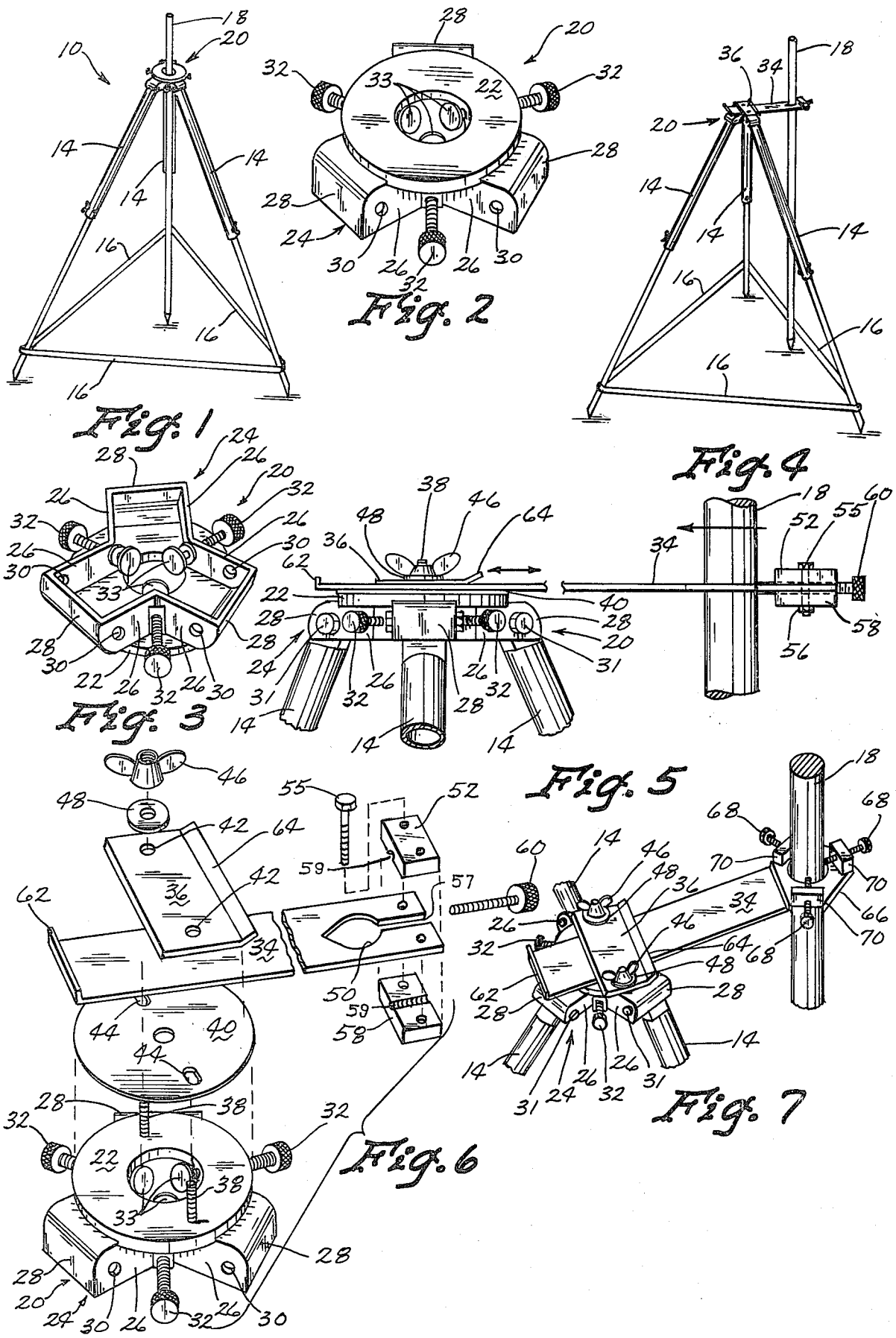

DEVICE FOR HOLDING A SURVEYOR'S RANGE POLE

BACKGROUND OF THE INVENTION

This is a continuation-in-part of application Ser. No. 97,193, filed Nov. 26, 1979, which was a continuation-in-part of application Ser. No. 953,704, filed Oct. 23, 1978 (now U.S. Pat. No. 4,192,076).

This invention relates to surveying equipment and specifically to a device for holding a surveyor's range pole.

Present surveyor's equipment includes electronic sighting devices which are aimed at a target instrument positioned some distance away. The target instrument is usually placed on the upper end of a surveyor's range pole of stake, and is capable of receiving a signal from the sighting instrument and directing a signal back to the sighting instrument.

when using the above types of surveying equipment, it becomes very important that the surveyor's pole or stake be accurately positioned, and that it be held in a stationary position during the taking of various sightings.

A prior improved holding device, U.S. Pat. No. 4,192,076, overcame many theretofore unresolved problems such as providing a stable, durable surveyor's stake holder that was also easy to move and realign. The present invention is an improvement to this prior device.

SUMMARY OF THE INVENTION

The present invention is a device for holding a surveyor's range pole rigid with respect to a base.

A single collar bracket or platform, which can alternately employ an extension arm and holding means, is secured to the apex of a tripod base. A first embodiment includes holding a range pole at the center of said collar by means of three horizontally disposed, adjustable plumb screws.

A second embodiment utilizes an extension arm attached to the top surface of said collar bracket by utilizing a pressure plate. The extension arm lies between two upright screws which are adapted to receive said pressure plate. Pressure is exerted by tightening wing nuts onto said screws.

The range pole can be affixed to said extension arm in one of two ways. First, the pole is passed through a teardrop shaped aperture near the extended end of said arm. A horizontally disposed adjustable screw is threaded through the edge of said arm and is used to supply pressure to secure the pole in place. This screw is located in the same horizontal plane as the arm. Secondly, a ring attachment with three adjustable screws spaced 120° apart can be clamped to the extended arm and the pole secured as in the first embodiment.

The extension arm includes an upwardly turned flange on one end thereof which mutually engages the edge of the pressure plate to prevent the arm from slipping out when the pressure plate is loosened and the device is turned from a vertical position. The pressure plate also has an upwardly angled flange on the one of its opposite edges presented away from the flange on the extension arm.

A primary object of the present invention is to provide a device for holding a surveyor's range pole with a tripod base and an extension arm which can be firmly secured by exerting minimal pressure on a pressure plate.

Another object of this invention is to provide a means for preventing the extension arm from slipping out when the pressure plate is loosened and the collar is tipped on edge.

A further object of this invention is to provide a device for holding a surveyor's instrument which holds the tripod legs in a stationary position and prevents them from moving with respect to one another.

A further object of the present invention is to provide a device for holding a surveyor's instrument which keeps the center of gravity of the combined tripod and surveyor's range pole radially inward from the leg ends of the tripod.

A further object of the present invention is to provide a device for holding a surveyor's instrument which is easily adjustable to permit the plumbing of a surveyors's range pole.

A further object of the present invention is to provide a device for holding a surveyor's instrument which is light and easy to transport.

A further object of the present invention is to provide a device for holding a surveyor's instrument which is easy to disassemble and repair.

A further object of the present invention is to provide a device for holding a surveyor's instrument which is economical to manufacture, durable in use and efficient in operation.

BRIEF DESCRIPTION OF THE DRAWINGS

FIG. 1 is a perspective view of the first embodiment of the present invention with the range pole centrally disposed.

FIG. 2 is a top perspective of the collar bracket.

FIG. 3 is a bottom perspective of the collar bracket.

FIG. 4 is a partial perspective of the second embodiment of the present invention with the range pole disposed through a teardrop aperture on the extension arm.

FIG. 5 is a partial side view of the second embodiment along line 4—4 of FIG. 4.

FIG. 6 is an exploded perspective of the assembled collar bracket and extension arm with teardrop aperture.

FIG. 7 is a partial perspective of the third embodiment of the present invention with range pole disposed through a ring attachment.

DETAILED DESCRIPTION OF THE PREFERRED EMBODIMENT

The device for holding a surveyor's range pole 10, includes a tripod base 12 with three identical telescoping legs 14 (FIG. 1). Three identical cross-supports 16, space legs 14 and add strength to the tetrahedron shape of the base. Range pole 18 is centrally disposed in FIG. 1 through the middle of collar or platform member 20. This is the first embodiment of the present invention.

FIGS. 2 and 3 shown collar member 20 which is a single piece of case aluminum. Collar member 20 includes a flat surfaced annular plate 22 supported by a three channeled frame 24. Each channel includes two identical side walls 26 and an arcuate cover member 28 (FIG. 3). Two holes 30 are provided in opposite side walls 26 of each channel so that one of tripod legs 14 can be inserted into the channel and secured thereto by pin 31 (see FIG. 5). The channels are spaced 120° apart with three adjustable plumb screws 32 threaded through side walls 26 of adjacent channels at the intersections thereof. Thus, plumb screws 32 are also spaced 120° apart. The radially inward end 33 of plumb screws 32 are flattened to prevent them from digging into range pole 18.

FIGS. 4, 5 and 6 display the second embodiment of the present invention. An extension arm 34 is secured to the top of annular plate 22 by means of a pressure plate 36. Two upright screws 38 are disposed in opposite sides of the central opening and annular plate 22 and are affixed thereto. A circular, steel wear plate 40 is disposed between annular plate 22 and pressure plate 36, and said wear plate and pressure plate each have a pair (at 42 and 44, respectively) of holes, said pair of holes being vertically registered and adapted to receive upright screws 38. A pair of wing nuts 46 and washers 48 thread onto upright screws 38 to supply securing pressure.

Teardrop shaped aperture 50 is located near the extended end of arm 34 at a point such that pole 18 will be vertically positioned radially inward of cross supports 16. Support block 52 is attached at the extended end to the top of arm 34 by means of a pair of bolts 55 and nuts 56 (only one of said pairs is shown) and underlying securing plate 58. Support block 52 and securing plate 58 are rectangular and their length is equal to the width of arm 34. Support block 52 and securing plate 58 are vertically registered, sandwich the end of arm 34 between them, and one of their lengthwise edges lies flush with the extended end of arm 34. A slot 57 is provided in the end of plate 34 and extends inwardly to aperture 50. Blocks 52, 58 each have a threaded groove 59 registered over slot 57. An adjustable screw 60 is centrally threaded through grooves 59 of support blocks 54, 58 in the same horizontal plane as the axis of arm 34. Pole 18 is thus engaged by the end of screw 60 and is pressed against the sides of the V-shaped portion of teardrop apertute 50 to provide a three point support. Because screw 60 is in the same horizontal plane as arm 34, the forces acting on range pole 18 are equal and opposite, thereby minimizing the tendency to tip or tilt pole 18.

The end of extension arm 34 opposite aperture 50 terminates in a flange 62 which curls upwardly. Similarly, pressure plate 36 includes an upward angled edge 64 which is facing away from flange 62.

Angled edge 64 facilitates the initial slidable insertion of flange 62 under plate 36. However, after this initial insertion, flange 62 will engage the straight edge of pressure plate 36 and will therefore not slide inadvertently out from under pressure plate 36.

The final embodiment of the present invention (FIG. 7) substitutes ring holder 66 for aperture 50. Three support screw 68 thread through identical support blocks 70 which are spaced 120° apart and secured to the top, flat surface of ring 66. Pole 18 is held at the center of ring 66 by adjusting screws 68 to mutually engage the sides of pole 18. The length of arm 34 would again be selected to insure that pole 18 was positioned radially inward of cross support 16.

In operation, the first embodiment allows for adjustment of telescoping legs 14 to bring pole 18 into rough plumb. Screws 32 are adjusted to center the pole 18. In the second and third embodiments, again legs 14 provide a rough plumb, then wing nuts 46 are tightened down to prevent arm 34 from twisting from the selected horizontal plane or rotating in place. Screw 60 provides the final adjustment in the second embodiment, as do screws 68 in the third embodiment. Little pressure is needed to secure arm 34 with this improved structure, because significant leverage, due to the lever arm formed by th distance between holes 42 and pressure plates 36, can be generated by moderately tightening nuts 46. This leverage provides pressure which opposes the vertical rotation of arm 34 (i.e., arm 34 twisting up out of the selected horizontal plane) and also prevents rotation of arm 34 within a horizontal plane.

Because upward turned flange 62 will engage the straight edge of pressure plate 36, device 10 can be turned on its side while being transported, and arm 34 will not slip off, even if wing nuts 46 are relatively loose. This greatly enhances the use of device 10 in the field. Positioning pole 18 radially inward of cross support 16 adds to the stability of all embodiments by keeping the center of gravity of device 10 within the triangular area formed by cross supports 16.

In any of the three embodiments, simple adjustments of a few screws will allow a high degree of accuracy in positioning the range pole. The use of a cast aluminum three channeled member 24 and a steel wear plate 40 will insure a durable device.

Thus, it is clear that the present invention accomplishes at least all of its stated objectives.

What is claimed is:

1. A device for holding a surveyor's range pole comprising:
    a tripod base having vertically lengthwise adjustable legs, the top ends of which form an apex of said base
    a support plate connected to the apex of said tripod base, said plate having a vertical opening extending therethrough for reception of a range pole which will extend to the ground;
    a plurality of adjustable screws threadably attached to said plate at a plurality of spaced apart points around said opening for threadable adjustment in a radial direction toward and away from the center of said opening, said screws having flattened inward ends, whereby said screws can be threadably moved into retentive engagement with said range pole when said range pole extends through said opening; and
    a reception means connected to the top ends of said legs of said tripod base, said reception means comprising a three of channels connected to the under surface of said plate and positioned in circumferentially spaced relation to one another around said opening in said plate, each of said upper ends of said legs beig pivotally secured to one of said channels for pivotal movement about a horizontal axis said three channel members connected to one another and said adjustable screws being threadably attached at the junctions between said channel members.

2. The device of claim 1 wherein said tripod base comprises three independently adjustable legs diverging downwardly and outwardly from said tripod's apex.

3. The device of claim 2 wherein said stabilizer means comprises rigid bar member pivotally attached to the bottom portion of each leg member and detachably securable to the lower portion of an adjoining leg member so that said stabilizer means hold each leg member rigid with respect to one another and is capable of detachment so that said legs of said tripod base may be folded inwardly for easy transport.

4. The device of claim 3 wherein said support plate comprises a flat surface annular collar member having a vertical opening extending therethrough.

5. The device of claim 4 wherein said adjustable screws have flattened radial center ends so that said screws will minimize damage to said range pole upon retentive engagement therewith.

* * * * *